United States Patent [19]
Buckley et al.

[11] Patent Number: 5,969,756
[45] Date of Patent: *Oct. 19, 1999

[54] TEST AND ALIGNMENT SYSTEM FOR ELECTRONIC DISPLAY DEVICES AND TEST FIXTURE FOR SAME

[75] Inventors: Eric Buckley, Scarborough; Branko Bukal, Thornhill; Wayne Dawe, Richmond Hill; Paul Farrer, Scarborough; Karoly G. Nemeth, Don Mills; Andrew Noonan, Oshawa, all of Canada

[73] Assignee: Image Processing Systems Inc., Ontario, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/670,694

[22] Filed: Jun. 26, 1996

Related U.S. Application Data

[63] Continuation-in-part of application No. PCT/CA95/00352, Jun. 13, 1995, which is a continuation-in-part of application No. 08/259,309, Jun. 13, 1994, abandoned.

[51] Int. Cl.⁶ .......................... H04N 17/00; H04N 17/02; H04N 17/04
[52] U.S. Cl. ............................................. 348/190; 348/191
[58] Field of Search .................................... 348/180, 181, 348/184, 187, 188, 189, 190, 191; H04N 17/04, 17/00, 17/02

[56] References Cited

U.S. PATENT DOCUMENTS

| | | | |
|---|---|---|---|
| 3,962,722 | 6/1976 | Ciciora | 358/10 |
| 4,330,779 | 5/1982 | Wilensky et al. | 340/705 |
| 4,415,921 | 11/1983 | Mulvanny et al. | 358/139 |
| 4,575,753 | 3/1986 | Mistry et al. | 358/118 |
| 4,688,079 | 8/1987 | Fendley | 358/10 |
| 4,751,570 | 6/1988 | Robinson | 358/88 |
| 4,754,329 | 6/1988 | Lindsay et al. | 358/139 |
| 4,760,444 | 7/1988 | Nielson et al. | 358/107 |
| 4,814,858 | 3/1989 | Mochizuki et al. | 348/191 |
| 4,893,925 | 1/1990 | Sweeny et al. | 356/72 |
| 5,032,769 | 7/1991 | Kawakami | 315/368 |
| 5,049,791 | 9/1991 | Kawakami | 315/368 |
| 5,216,504 | 6/1993 | Webb et al. | 358/139 |
| 5,371,537 | 12/1994 | Bohan et al. | 348/181 |

FOREIGN PATENT DOCUMENTS

| | | | |
|---|---|---|---|
| 404700 | 12/1990 | European Pat. Off. | H04N 17/04 |
| 0 577 380 A1 | 1/1994 | European Pat. Off. | |
| WO95/34906 | 12/1995 | WIPO | H04N 17/04 |

OTHER PUBLICATIONS

Kim, S.R. et al; "Design sand Implementation of an Automatic Adjustment System for Integrated Tube Components" *Mechatronics*, vol. 4, No. 1, pp. 1–23; Oxford, Great Britian.

Lin, Robert Jr.; "Automated CRT inspection and Alignment"; *Information Display*; vol. 4, No. 6, 8, pp. 16–17.

Hibara, T. et al, "Automatic adjustment for color display monitor"; Proceedings of 1986 International Conference on Industrial Electronics, Control & Instrumentation (IECON), Milwaukee, WI, pp. 164–169.

*Primary Examiner*—Michael Lee
*Attorney, Agent, or Firm*—Venable; Robert Kinberg

[57] ABSTRACT

A test and alignment system for an electronic display device comprises a test pattern generator to be connected to an electronic display device for causing images of video test patterns to be displayed by the electronic display device. A test fixture is positioned in front of the electronic display device to be tested and aligned. The test fixture includes a frame supporting a plurality of close-up optical sensors to sense and produce image signals corresponding to small areas of images displayed on the electronic display device and a plurality of wide-angle optical sensors behind the close-up optical sensors for sensing and producing image signals corresponding to large areas of images displayed on the electronic display device. A computer controls the test pattern generator and processes and analyses the image signals generated by the close-up and wide-angle optical sensors to perform a series of tests on the electronic display device. A display provides a visual indication of the results of the series of tests performed by the computer.

37 Claims, 10 Drawing Sheets

TEST AND ALIGNMENT SYSTEM FOR ELECTRONIC DISPLAY DEVICES AND TEST FIXTURE FOR SAME

RELATED APPLICATIONS

The present application is a continuation-in-part of PCT application serial No. PCT/CA95/00352 filed on Jun. 13, 1995 designating the United States which is a continuation-in-part of U.S. application Ser. No. 08/259,309 filed on Jun. 13, 1994, now abandoned.

FIELD OF THE INVENTION

The present invention relates to testing systems and in particular to a test and alignment system for an electronic display device and to a test fixture for the same.

BACKGROUND OF THE INVENTION

During the manufacture and assembly of electronic display devices, such as for example cathode ray tube (CRT) assemblies for computer monitors and television sets, precise mechanical, optical and electronic adjustments are required to ensure the electronic display devices provide optimum reproduction image quality. These adjustments include, but are not limited to, focus, purity of color, convergence of beams, color uniformity, geometry, and luminance. Each of these adjustments is typically performed independently of the others by a trained technician with the aid of a testing and alignment system. Unfortunately, many testing and alignment systems are deficient because they are unable to perform all of the tests needed to align precisely a CRT assembly, are very slow and unable to provide real-time feedback for operator adjustments, are not sufficiently accurate and are not integrated to perform each of the tests in an optimized sequence and then recheck and readjust measurements as required.

To deal with the above-described problems, improved test and alignment systems for electronic display devices have been developed. For example, PCT application serial No. PCT/CA95/00352 published on Dec. 21, 1995 and assigned to Image Processing Systems Inc., the assignee of the present invention, discloses a test and alignment system for electronic display devices. The system includes a plurality of color CCD cameras mounted on a frame and arranged in an array. The rows of CCD cameras in the array are vertically adjustable and the CCD cameras in each row are laterally adjustable to allow the system to test and align different sized electronic display devices. The image output of the CCD cameras is conveyed to a computer for processing. The computer controls a test pattern generator connected to the electronic display device being tested so that the electronic display device displays appropriate test patterns of which images are captured by the CCD cameras. A wobulator is mounted on the frame and is moveable between an operable position adjacent the electronic display device and a retracted position outside of the fields of view of the CCD cameras. The wobulator is energizable to bend electron beams within the electronic display device when in the operable position. Photodiodes, also mounted on the frame, measure the luminance of the electronic display device as the wobulator bends the electron beams therein and provide input to the computer for processing.

The computer performs a comprehensive series of test and alignment functions on the electronic display device based on the image output of the CCD cameras and the output of the photodiodes as the test patterns are displayed. The test and alignment functions include color purity, focus, static and dynamic convergence, yolk rotation, orthogonality, video pattern size and centering, raster size and centering, linearity, geometry and luminance measurements and are all performed at a single station. During the series of test and alignment functions, the computer displays graphical indicators which are used by an operator to determine if the electronic display device passes or fails a test.

U.K. patent application No. 2,255,700 published on Nov. 11, 1992 and assigned to Samsung Electron Devices Company Ltd. discloses a system for measuring cathode ray tube (CRT) characteristics. The system comprises a camera, a selector, a video processor, a monitor, a magnetic field controller, a CPU and an output unit. The camera includes an array of CCD cameras as well as a plurality of magnetic field coils which are energized by the magnetic field controller under control of the CPU to move an electron beam within the CRT. Image output of the CCD cameras is conveyed to the CPU for processing. In one embodiment, the CCD cameras are movably mounted on a support to allow the position of the CCD cameras relative to the CRT under examination to be adjusted.

Although the above-described references show test and alignment systems for electronic display devices including a plurality of CCD cameras which are moveable relative to the electronic display device under examination and allow at least one characteristic of the electronic display device to be measured, improved systems for testing and aligning electronic display devices are continually being sought.

It is therefore an object of the present invention to provide a novel test and alignment system for an electronic display device and a test fixture for the same.

SUMMARY OF THE INVENTION

According to one aspect of the present invention there is provided a test fixture for a test and alignment system for an electronic display device comprising:

a frame;

a plurality of close-up optical sensors mounted on said frame to sense and produce image signals corresponding to small areas of an image displayed on an electronic display device positioned adjacent said test fixture; and a plurality of wide-angle optical sensors mounted on said frame behind said close-up optical sensors, said wide-angle optical sensors for sensing and producing image signals corresponding to large areas of said image displayed on said electronic display device.

Preferably, the wide-angle optical sensors have fields of view which include the small areas of the displayed image and which overlap so that the wide-angle optical sensors sense and produce image signals corresponding substantially to the entire image displayed on the electronic display device. It is also preferred that the close-up optical sensors are positioned on the frame so as to be outside of the overlapping fields of view of the wide-angle optical sensors.

In one embodiment, the close-up optical sensors are arranged in an array with the rows of close-up optical sensors in the array being mounted on vertically adjustable, angled rails. The optical sensors in each row are also moveable laterally along the rails to allow the position of the optical sensors to be adjusted to accommodate different sized electronic display devices. Preferably, the array includes a centrally positioned, vertically adjustable close-up optical sensor mounted on a cantilever extending from the frame.

It is also preferred that the test fixture includes at least one wobulator mounted on the frame for creating a magnetic field to bend electron beams within the electronic display device. In one embodiment, the wobulator includes at least one pair of spaced coils mounted on the frame which are energizable to create an alternating magnetic field sufficient to encompass generally the entire electronic display device. It is however preferred that the wobulator includes a pair of vertically spaced, generally horizontal coils and a pair of laterally spaced, generally vertical coils with each of the pairs of coils being energizable to create the alternating magnetic fields and being fixed to the frame in positions outside of the field of view of the close-up and wide-angle optical sensors.

According to another aspect of the present invention there is provided a test and alignment system for an electronic display device comprising:

a test pattern generator to be connected to an electronic display device for causing said electronic display device to generate images of video test patterns;

a test fixture including a frame supporting a plurality of close-up optical sensors to sense and produce image signals corresponding to small areas of images displayed on said electronic display device and a plurality of wide-angle optical sensors behind said close-up optical sensors for sensing and producing image signals corresponding to large areas of images displayed on said electronic display device;

a computer controlling said test pattern generator and processing said image signals to perform a series of tests on said electronic display device; and a display to provide a visual indication of the results of said series of tests.

According to still yet another aspect of the present invention there is provided a test fixture for a test and alignment system for an electronic display device comprising:

a frame;

at least one optical sensor mounted on said frame to sense and produce image signals corresponding to an image displayed on an electronic display device positioned adjacent said test fixture; and at least one wobulator mounted on said frame and including at least one pair of spaced coils energizable to create an alternating magnetic field to bend electron beams within said electronic display device, said coils being fixed to said frame outside of the field of view of said at least one optical sensor.

The present invention provides advantages in that the close-up optical sensors in combination with the wide-angle optical sensors mounted on the frame allow small areas and large areas of images displayed on the electronic display device to be captured simultaneously without requiring the close-up optical sensors to be moved. This allows a comprehensive series of test and alignment functions to be performed quickly on the electronic display device. Also, the wobulator design allows the coils to be permanently mounted on the frame outside of the fields of view of the close-up and wide-angle optical sensors while still allowing it to generate the desired alternating magnetic fields to bend electron beams within the electronic display device. This further speeds up the test and alignment procedure.

BRIEF DESCRIPTION OF THE DRAWINGS

An embodiment of the present invention will now be described more fully with reference to the accompanying drawings in which:

FIG. 2b is a top cross-sectional view of the test fixture illustrated in FIG. 2a;

FIG. 2c is a side cross-sectional view of the test fixture illustrated in FIG. 2a;

FIG. 3 is an enlarged cross-sectional view of a portion of the test fixture illustrated in FIG. 2a;

FIG. 4 is an enlarged cross-sectional view of another portion of the test fixture illustrated in FIG. 2a;

DESCRIPTION OF THE PREFERRED EMBODIMENTS

Figure 1:
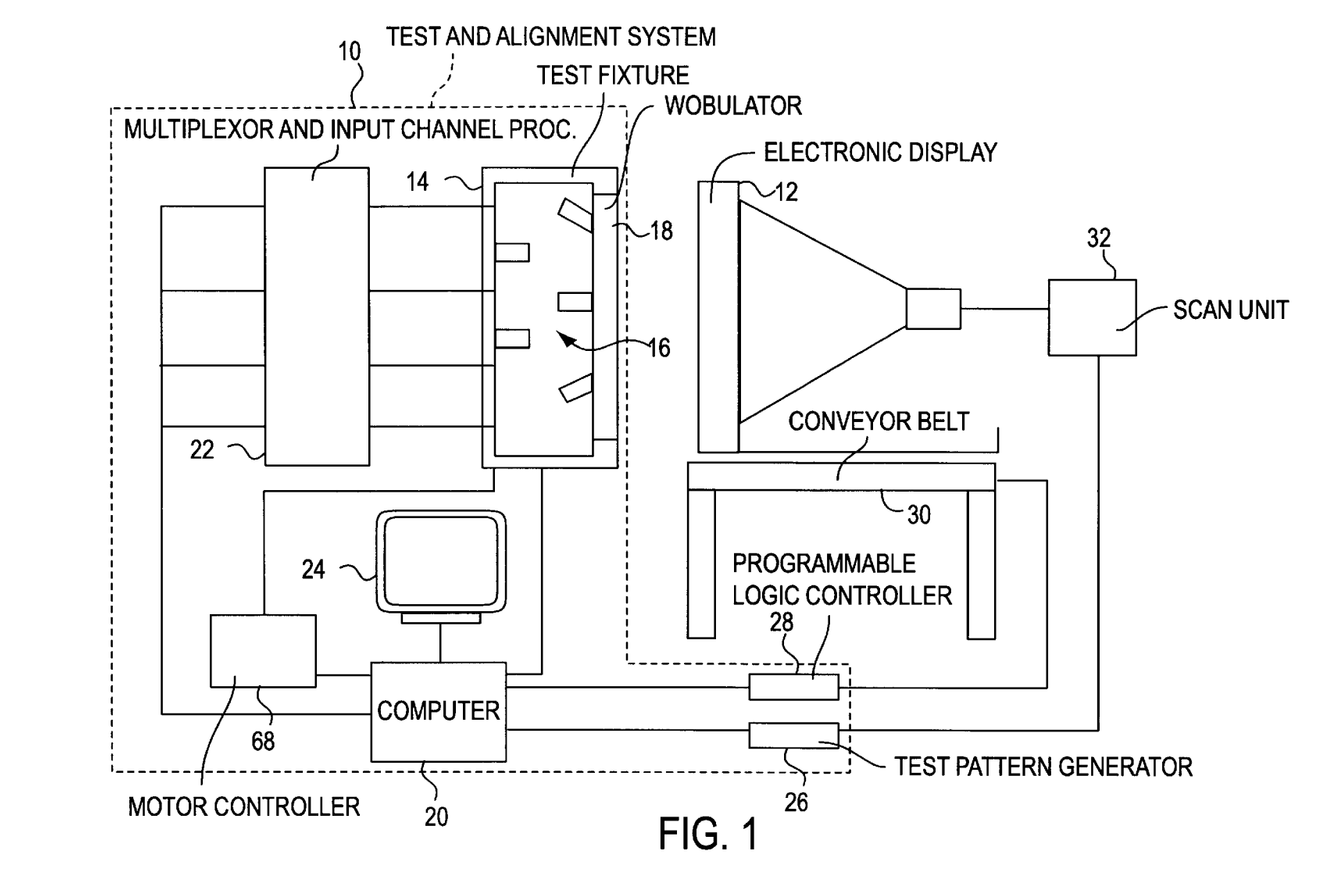
FIG. 1 is a block diagram of a test and alignment system for an electronic display device in accordance with the present invention.

Referring to FIG. 1, a schematic illustration of a test and alignment system for an electronic display device 12 including CRT assemblies and television sets or computer monitors is shown and is generally indicated to by reference numeral 10. System 10 includes a test fixture 14 on which are mounted a plurality of optical sensors 16 to capture images of test patterns displayed on the electronic display device 12 and to generate video image signals corresponding to the captured images. A wobulator 18 is also mounted on the test fixture 14 to bend electron beams within the electronic display device 12 as will be described.

The video image signal output of the optical sensors 16 is conveyed to a computer 20 by way of a multiplexer and high speed video input channel processor generally indicated to by reference numeral 22. The computer 20 is connected to an operator display 24, to a test pattern generator 26 and to the wobulator 18. The test pattern generator 26 feeds test patterns to the electronic display device 12 for display under the control of the computer 20. The computer 20 can also be connected to a programmable logic controller (PLC) 28 for controlling movement of a conventional conveyor belt 30, on which electronic display devices are supported, to position each electronic display device to be tested in front of the test fixture 14. A power supply including deflection amplifiers and video amplifiers, heater and high voltage power sources, commonly referred to as a scan unit 32, that is required to operate the electronic display device 12 is also shown for reference.

The computer 20 analyses the video image signal output of the optical sensors 16 after being processed by the multiplexer and video input channel processor 22 and performs a comprehensive series of tests and alignment functions to determine the condition of the electronic display device 12. The test and alignment functions performed by the computer 20 include color purity, focus, static and dynamic convergence, yoke rotation, perpendicularity or orthogonality, video pattern size and centering, raster size and centering, linearity, geometry, and luminance measurements including brightness cut-off. During testing, the computer 20 generates graphical indicators which are displayed on the operator display 24 to allow the operator to determine easily if the electronic display device 12 passes or fails each test.

Figure 2A:
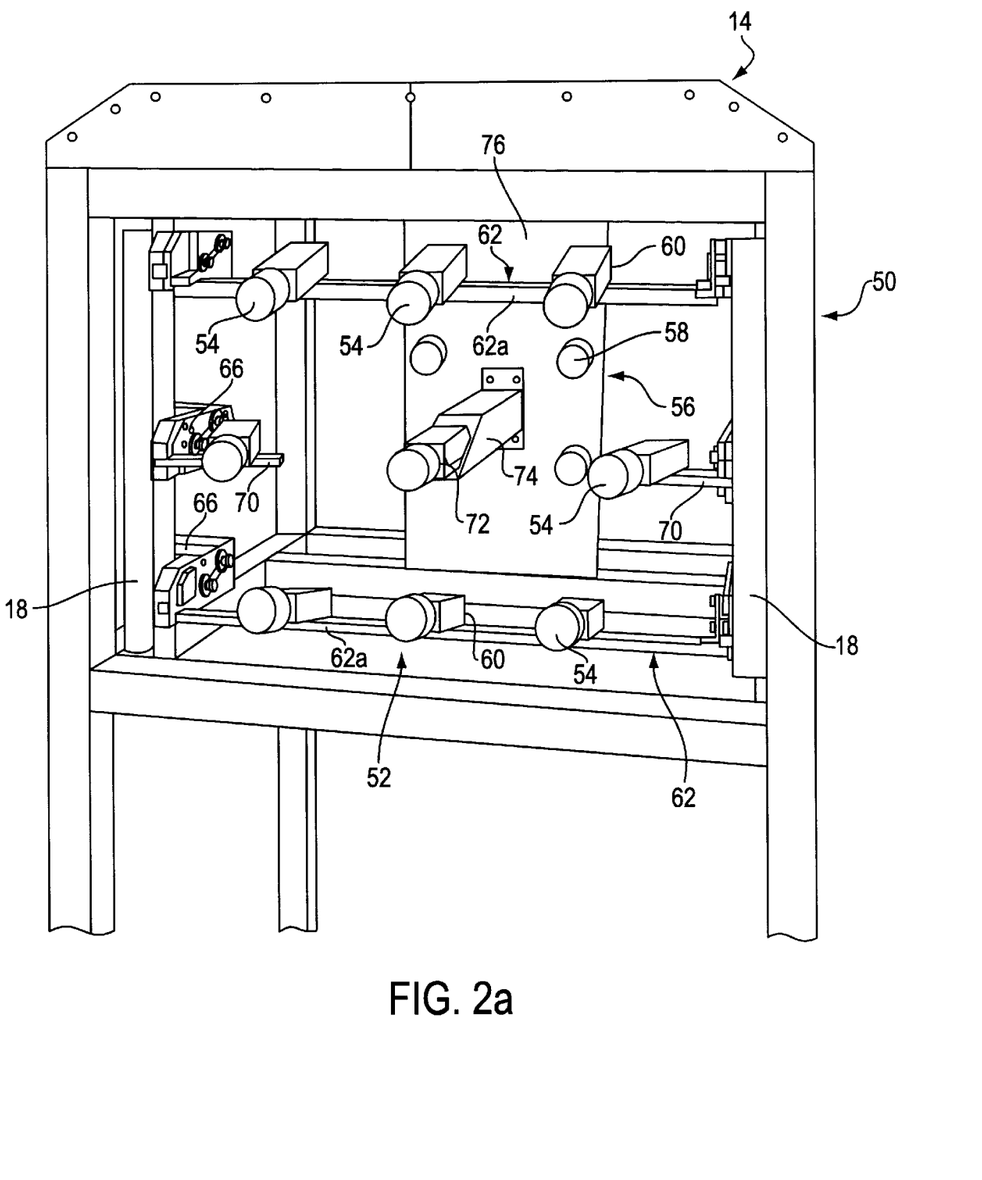
FIG. 2a is a perspective view of a test fixture forming part of the test and alignment system illustrated in FIG. 1.
Figure 2B:
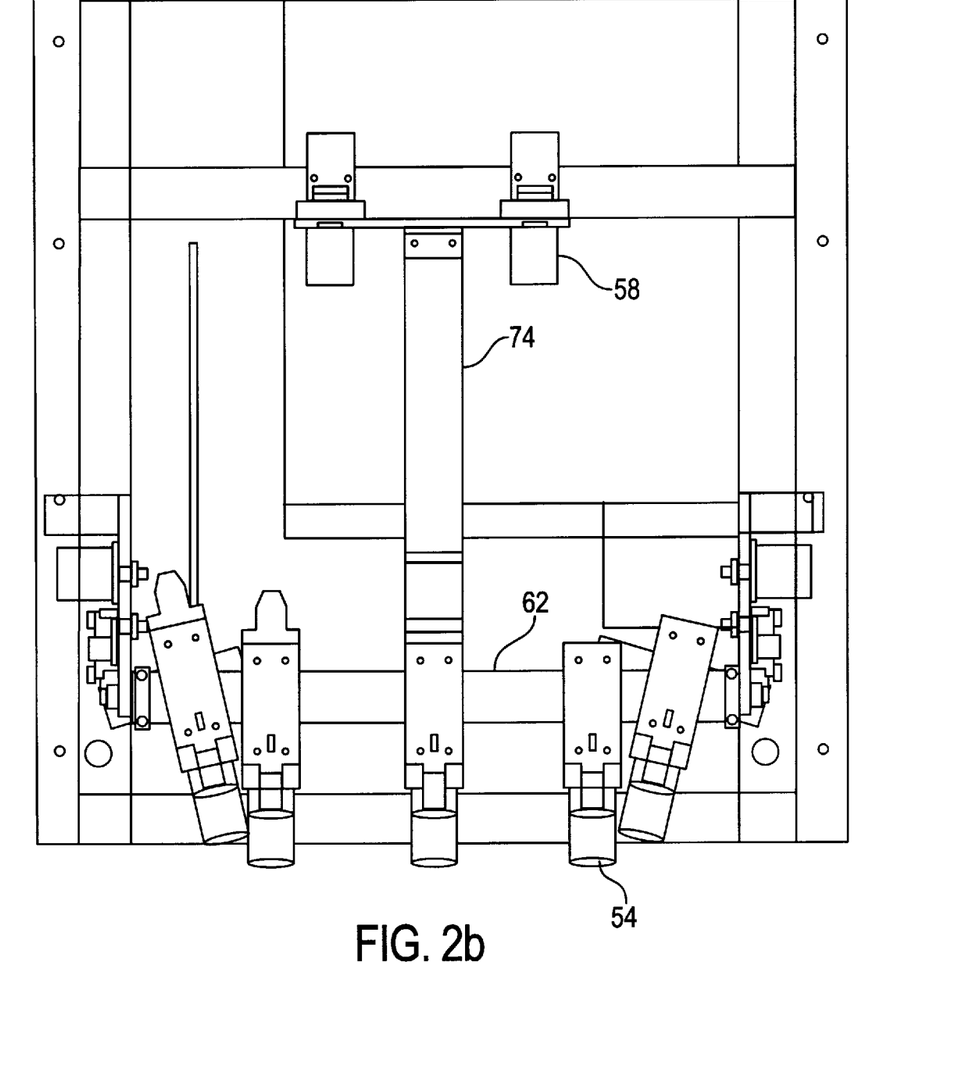
Figure 2C:
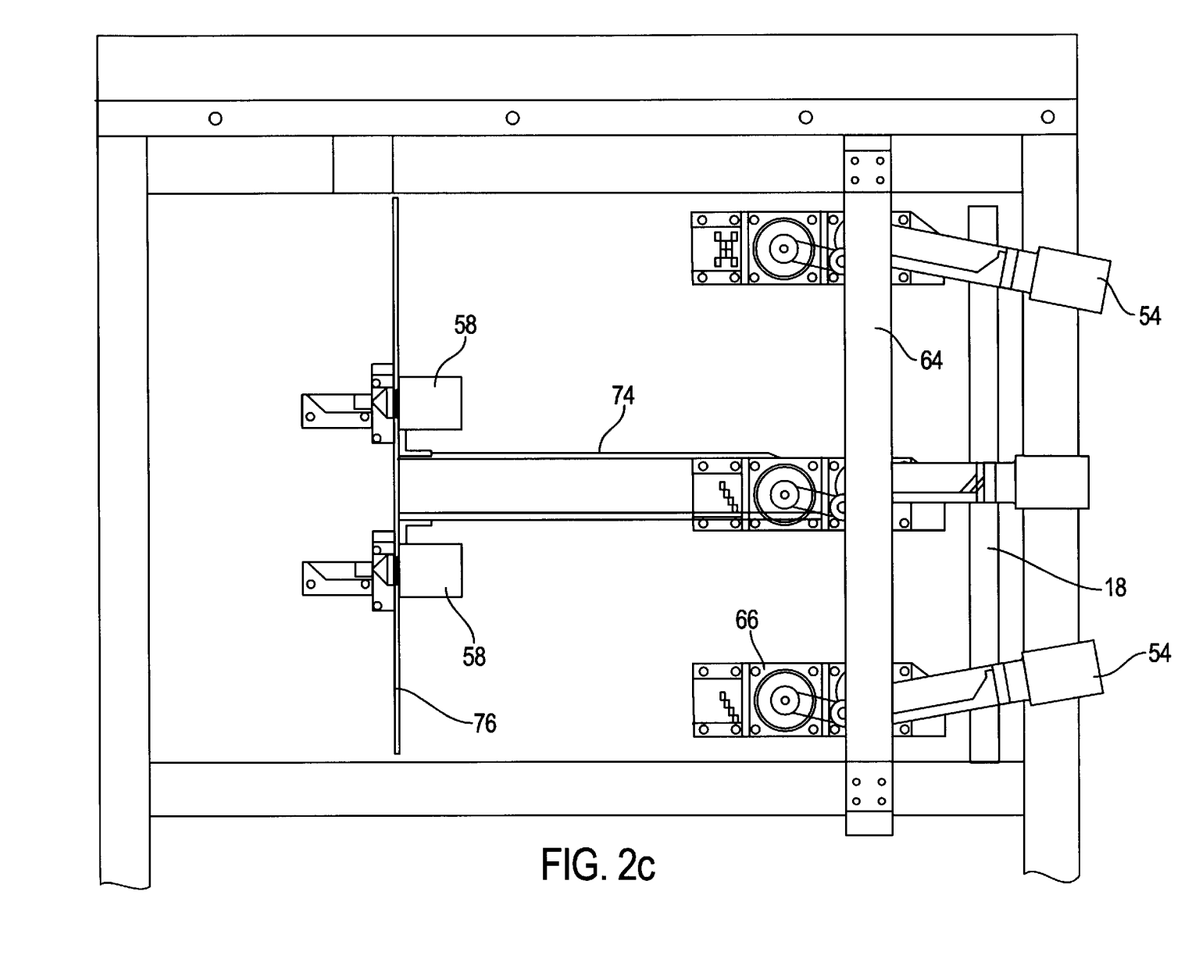

Referring now to FIGS. 2a to 2c, the test fixture 14 is better illustrated. As can be seen, the test fixture 14 includes a box-like frame 50 which accommodates the optical sensors 16. The optical sensors 16 are arranged in two sets and include an array 52 of close-up digital color CCD cameras 54 and an array 56 of wide-angle digital color CCD cameras 58. In this particular example shown, array 52 includes three rows with each row having three CCD cameras 54 and array 56 includes two rows with each row having two CCD cameras 58. Those of skill in the art will however appreciate that the number of CCD cameras shown is for illustrative purposes only and that the test fixture 14 may include a significantly larger number of CCD cameras 54 and 58 arranged in larger arrays 52 and 56.

The CCD cameras 54 in the upper and lower rows of array 52 are supported by carriages 60 mounted on generally horizontal rails 62. The rails 62 extend between a pair of generally vertical rails 64 fixed to the frame 50. The ends of the rails 62 are received by drives 66 in the form of servo-motors. The drives 66 are movable along the vertical rails 64 in response to input from a motor controller 68 (see FIG. 1), operated by the computer 20 to adjust the vertical position of the upper and lower rows of CCD cameras 54. The upper surface 62a of the upper rail 62 is downwardly inclined and the upper surface 62a of the lower rail is upwardly inclined so that the CCD cameras 54 supported by the rails are angled towards the electronic display device 12.

The outer CCD cameras 54 of the middle row of array 52 are supported by carriages 60 mounted on stubs 70. Each stub 70 is held by a drive 66 moveable along a respective rail 64 in response to motor controller 68 to adjust the vertical position of these CCD cameras 54. The stubs 70 extend inwardly and rearwardly from the drives 66 so that the CCD cameras 54 supported by the stubs are also angled towards the electronic display device 12. The central CCD camera 54 of the middle row of array 52 is supported by a carriage 72 mounted on a cantilever 74 by way of a hinge 75. Cantilever 74 extends from a face plate 76 secured to the back of frame 50.

Figure 3:
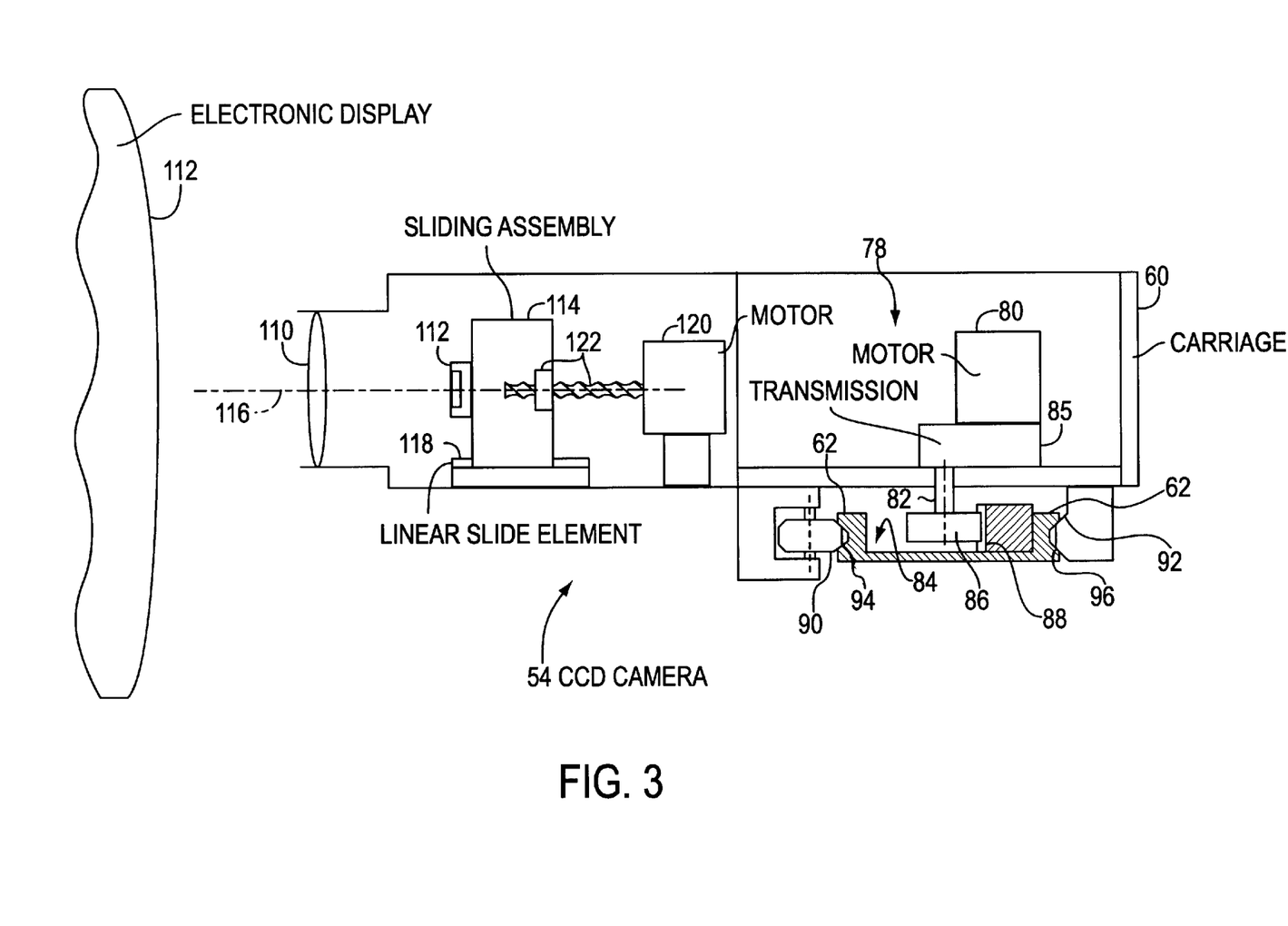

Each of the carriages 60 accommodates a drive 78 which is responsive to motor controller 68 to move the carriage 60 along the rail 62 or stub 70 and therefore, adjust the lateral position of the CCD camera 54 supported by the carriage. As can be seen in FIG. 3, each drive 78 includes a motor 80 for rotating a shaft 82 extending into a channel 84 in the rail 62 or stub 70 by way of a transmission 85. A pinion 86 is mounted on the shaft 82 and is positioned within the channel 84. The pinion engages a rack 88 formed on a wall of the rail 62 or stub 70. Guides 90 and 92 extending from the carriages 60 are accommodated by complimentary grooves 94 and 96 formed in the rails 62 and stubs 70 to guide the carriages 60 as they move laterally along the rails and stubs.

Figure 4:
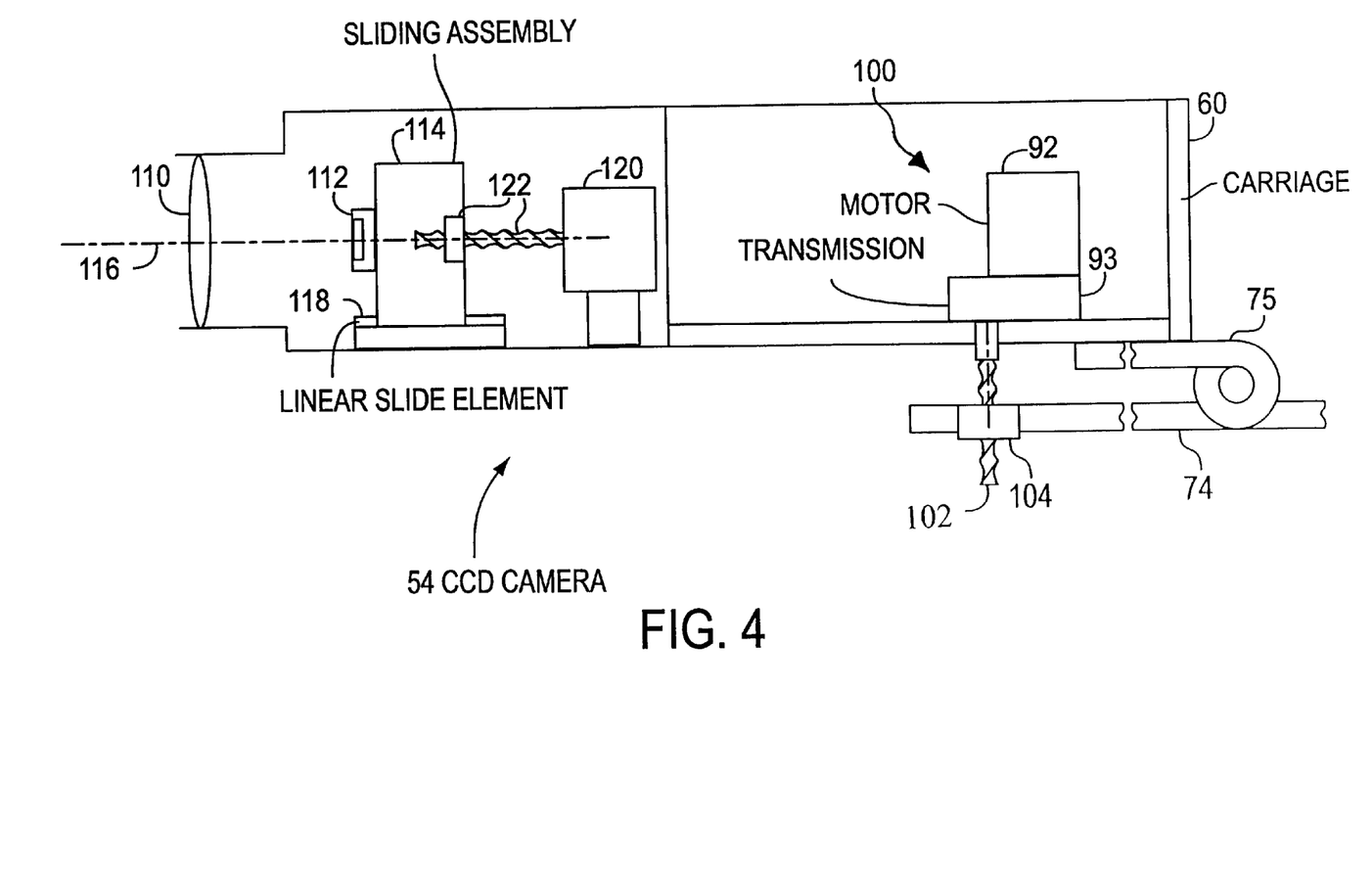

Unlike carriages 60, carriage 72 is not laterally adjustable. Carriage 72 however supports a drive 100 responsive to motor controller 68 to pivot the carriage relative to the cantilever 74 by way of hinge 75 and adjust its position and hence the position of the central CCD camera 54. Drive 100 is best shown in FIG. 4 and includes a motor 92 and a transmission 93 for rotating a lead screw 102 cooperating with a stationary nut 104 mounted on the cantilever 74.

Referring back to FIG. 3, one of the CCD cameras 54 is better illustrated. As can be seen, the CCD camera is equipped with a lens 110, such as a Tamron 50 MM lens, sold under model number 402026 by Tamron Corp. of Japan. A CCD chip 112 is disposed behind the lens 110 at a desired distance so that a certain small detail of the entire image displayed on the electronic display device 12 is in focus when it strikes the CCD chip. The CCD chip 112 is mounted on a sliding assembly 114, which is able to reciprocate in a linear direction parallel to the optical axis 116 through lens 110. The sliding assembly 114 is abutted against and guided by a linear slide element 118, and is driven by a motor 120 via a lead-screw assembly 122. The motor 120 is responsive to motor controller 68 to position the CCD chip 112 in relation to the lens 110 so that the image displayed on the electronic display device 12 and projected onto CCD chip 112 by lens 110 is sharp and in focus.

Referring again to FIGS. 2a to 2c, mounted on the face plate 76 and surrounding the cantilever 74 is the array 56 of wide-angle CCD cameras 58. The wide-angle CCD cameras 58 have overlapping fields of view so that the video image signal output of the wide-angle CCD cameras 58 represents basically the entire displayed image on the electronic display device 12.

The inclined orientation of the CCD cameras 54 in the upper and lower rows of array 52 and the positions of the CCD cameras 54 supported on the stubs 70 and cantilever 74 result in the CCD cameras 54 being outside of the fields of view of the wide-angle CCD cameras 58. Thus, even though the wide-angle CCD cameras 58 are mounted on the frame 50 behind the close-up CCD cameras 54, the wide-angle CCD cameras 58 have unobstructed fields of view. As such, images can be captured simultaneously by both arrays of CCD cameras. Furthermore, it has been found that the inclined orientation of the CCD cameras 54 improves resolution as compared with in-line oriented CCD cameras due to the convex nature of most electronic display devices.

The wobulator 18 is mounted on the frame 50 adjacent the electronic display device 12. The wobulator 18 includes a pair of laterally spaced, generally vertical coils as shown in FIG. 2a. A pair of vertically spaced, generally horizontal coils may also be utilized in the wobulator 18 but are not illustrated. The coils are secured to the frame 50 and positioned such that they are outside of the fields of view of the CCD cameras 54 and 58. The coils are wound and dimensioned to create symmetrical alternating magnetic fields, when energized, that are sufficient to encompass substantially the electronic display device 12 under test and bend electron beams within the electronic display device.

The computer 20 includes a number of software routines which are executed during operation of the test and alignment system 10. In particular, the computer 20 includes a set-up routine which includes CCD camera 54 position information for the various sized electronic display devices which are to be tested by the test and alignment system 10. When the computer 20 executes the set-up routine, the computer supplies output to the motor controller 68 which in turn provides input to the drives 66 and 78 to move the rails 62, stubs 70 and/or carriages 60 and 72 to position the CCD cameras 54 at the proper desired positions. The computer 20 also includes conventional Image Analysis Software to determine if the CCD cameras 54 and 58 are in focus. If the CCD cameras are not in focus, the computer 20 provides output to the motor controller 68 which in turn operates motors 120 to adjust the positions of the CCD chips 112 by way of lead-screw assemblies 114. The computer also includes a test and alignment routine which when executed by the computer 20 allows the video image signal output of the CCD cameras 54 and 58 that is received by the computer to be processed and a series of tests to be performed on the electronic display device. The series of tests performed by test and alignment system 10 is similar to the series of tests disclosed in PCT application serial No. PCT/CA95/00352 filed on Jun. 13, 1995 designating the United States, the contents of which are incorporated herein by reference.

Calibration of the Wide-Angle Cameras

The fields of view of the wide-angle color CCD cameras 58 of array 56 must be calibrated to identify and store for reference, the relationship of camera pixel locations to the corresponding points in their respective fields of view, and further to ensure that their fields of view overlap and encompass the desired area of interest. The preferred method to achieve the above will now be described.

Figure 11:
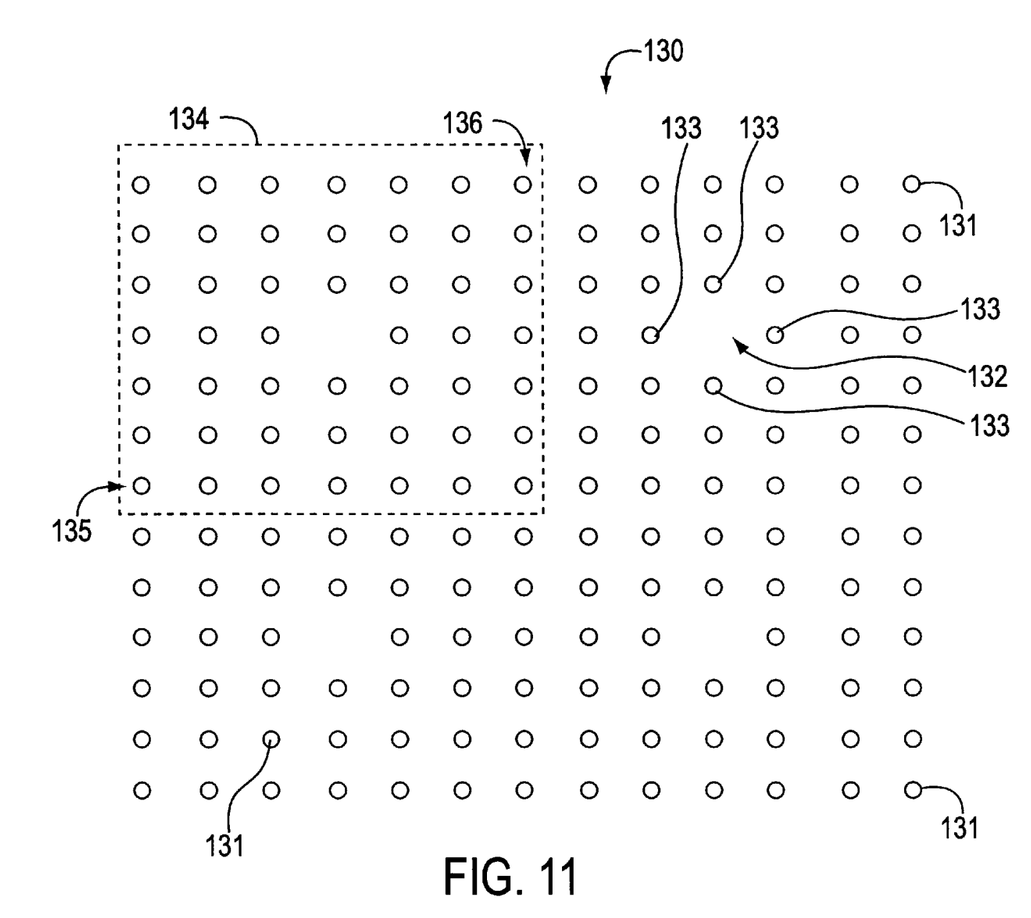
FIG. 11 is a front elevational view of a calibration grid used to calibrate wide-angle cameras forming part of the test and alignment system illustrated in FIG. 1.

Referring now to FIG. 11, a calibration grid 130 is shown in negative form for ease of illustration. Grid 130 is in the form of a sheet having a plurality of rows of symmetrically geometrically shaped, for example rectangular, or in the preferred form, circular, apertures 131 spaced equally in each axis therethrough. The apertures 131 are formed in the sheet with precision, so that the distances between the centers of the adjacent apertures are known to a high degree of accuracy. A preferred method of creating grid 130 is by computer aided design (CAD) methods and further by photoplotting the design on high stability photographic film. For the calibration process, suitable back-lighting is applied. Although the grid 130 is illustrated in negative form, those of skill in the art will appreciate that in reality the apertures 131 are transparent and the surrounding areas of the grid 130 are opaque.

At spaced locations on the sheet, corresponding to the spacing of the wide-angle CCD cameras 58 in the array 56, the apertures 132 are identifiably different from all other apertures in the grid 130. For example, these special apertures may have different shapes or sizes. In the preferred embodiment, they are differentiated in effect by size to the extreme, by omitting them entirely. This results in larger, generally rectangular opaque areas 132 being provided on the grid 130.

During the computer image analysis process of the calibration grid, the location of the omitted apertures 132 are calculated by interpolating the coordinates of the adjacent apertures 133. These locations of the omitted apertures 132 are regarded as the central points of the region of interest 134 for each of the wide-angle CCD cameras 58. Since the distance between adjacent apertures in each row is known, the field of view of each CCD camera 58 is determined by counting the number of apertures 131 on grid 130 within the field of view along the four orthogonal directions extending from the centers of the field of view. Along each adjacent edge of the fields of view of adjacent CCD cameras 58 is located a row 135 or a column 136 of apertures 131 that is within the regions of interest of both adjacent CCD cameras. Thus their regions of interest 134 overlap. This arrangement facilitates the accurate spatial connections of areas viewed by the separate wide-angle color CCD cameras 58 of array 56, so that they encompass the entire desired area of interest.

During the application of the system 10, the electronic display device 12 is located in the generally desired location in relation to test fixture 14, where the calibration was performed using the grid 130. The test pattern applied to the electronic display device 12 for the evaluation or alignment of the image geometry displayed thereon is constructed of generally rectangularly shaped dots such that some of the dots fall within the overlapping areas of adjacent CCD cameras 58. By correlating the locations of the dots viewed by the adjacent CCD cameras, and further applying trigonometric calculations that are known to those of skill in the art, the exact location of dots displayed by the electronic display device 12 can be identified in all three dimensions. Furthermore, by including the geometric constants relating to the electronic display device 12, such as the radius of curvature and the thickness and refraction constant of glass utilized, corrections can be made for all major error sources by computer calculations. In effect, the CCD cameras 58 of array 56 can analyze the displayed image as if it were viewed from an infinite distance, which is advantageous for the definition of geometric errors.

Test and Alignment System Operation

The operation of the test and alignment system will now be described. Initially, the computer 20 executes the set-up routine to position the CCD cameras 54 at the proper positions so that the fields of view of the CCD cameras are directed towards the electronic display device 12 to be tested and aligned. Following that, the computer 20 conditions the test pattern generator 26 to feed test patterns to the electronic display device. The electronic display device 12 in turn displays the test patterns. The CCD cameras 54 and 58 which are maintained in focus, capture images of the displayed test patterns. The close-up CCD cameras 54 focus in on small details of the displayed image and therefore, capture small areas of the entire test pattern displayed on the electronic display device 12. On the other hand, the wide-angle CCD cameras 58, which have overlapping fields of view, collectively capture an image of the entire test pattern displayed on the electronic display device.

The video image signals output by the CCD cameras 54 and 58 are multiplexed and processed by the multiplexer and high speed video input channel processor 22. The high speed video input channel processor 22 performs a variety of fundamental image processing operations on the video image signals including digitizing after multiplexing, integration, thresholding, interpolation, histogram analysis as well as horizontal and vertical projections. The video input channel processor also converts the video image signals from luminance and chrominance values to red, green and blue values for processing by the computer 20.

As mentioned previously, the computer 20 analyses the video image signal output of the CCD cameras 54 and 58 to perform a comprehensive series of tests on the electronic display device when executing the test and alignment routine. The modular nature of the test and alignment routine allows an operator to condition the computer 20 to perform the tests in virtually any order and re-perform one or more of the tests if desired. The various tests which the computer 20 can perform will now be described with reference to FIGS. 5 to 10.

Focus

Figure 5:
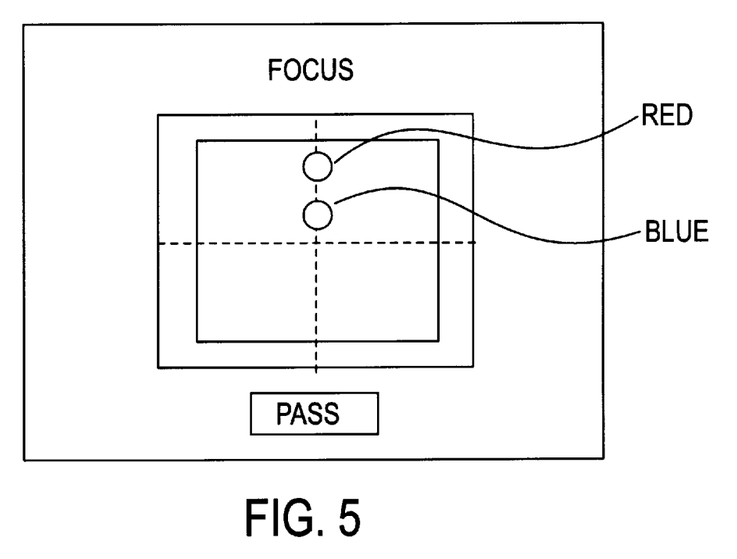
FIGS. 5 to 10 are diagrams illustrating graphical panels displayed to an operator during operation of the test and alignment system illustrated in FIG. 1.

To measure focus, the video image signals output by the close-up CCD cameras 54 are analyzed by computer 20. A technique in software is used involving first measuring line width for the spot size and then measuring the depth of contrast which is a Modulation Transfer Function (MTF). Other focus determination methods based on analysis of pixel intensity histogram or dimensions of small features displayed on the electronic display device 12 such as dots, may be applied. By determining the center of the mass and measuring the spot size at the center of the depth of contrast, the dot correlates very well to the human eye's perception of good focus. During this test, the computer 20 generates a graphical panel for display on the operator display 24 together with a "PASS" or "FAIL" readout, as shown in FIG. 5. The focussing voltage applied to the electronic display device 12 may be adjusted by the scan unit 32 to improve the focus of the electronic display device. The electronic display device under test is considered to be focused within the specified limits when the red "ball" is located within the dotted rectangle. The closer the red "ball" is to the center of the crosshairs the better the focus of the electronic display device 12.

Color Purity/Vertical Raster Shift/Yoke Rotation

Figure 6:
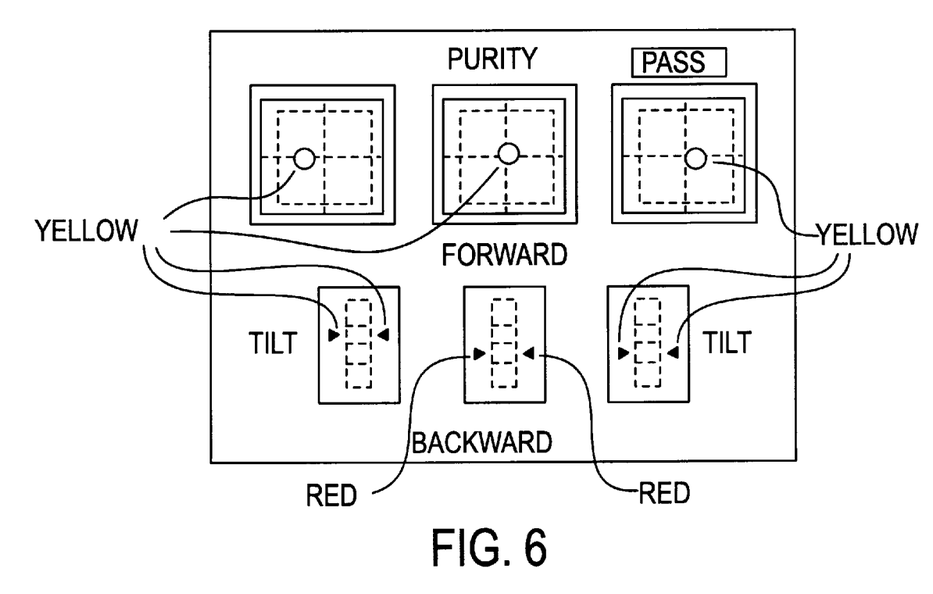

During the "Color Purity/Vertical Raster Shift/Yoke Rotation" test, the computer 20 generates a graphical panel as shown in FIG. 6 for display on the operator display 24. The graphical panel includes several video meters which indicate adjustments to the yoke and two purity rings of the electronic display device. As the operator moves the yoke backward and forward, the "balls" in both of the upper, outside square-boxed meters move from the outside towards the center of the screen and back and the lower middle meter pointers move up and down. Rotation of the yoke will register in both of the lower outside "Tilt" meters. Movement of the two purity rings will register in all three of the upper meters. As well, the upper middle meter will indicate vertical raster shift related to the top to bottom position of the indicator "ball". The operator display 24 also displays a "PASS" or "FAIL" readout dependent on whether or not the adjustment specifications have been met.

During color purity and luminance measurements, the wobulator 18 is energized to bend electron beams within the electronic display device 12 as the images are being captured by the CCD cameras 54 and 58. Specifically, the vertical coils of wobulator 18 are simultaneously energized by an alternating polarity current. The coils generate a vertical symmetrical alternating magnetic field which encompasses the electronic display device and deflects horizontally, the electron beams impinging upon the phosphors in the electronic display device. The alternating symmetrical deflection of the electron beams in relation to the phosphor dots or phosphor stripes in the electronic display device result in equal reduction of emitted light intensity provided the electron beams are aligned with the center of the phosphor dots or stripes when no magnetic field is generated by the wobulator 18. Any difference in light intensity is an indication of discrepancy in beam landing.

Following this, the horizontal coils of wobulator 18 (if included) are simultaneously energized to generate a symmetrical alternating horizontal magnetic field which encompasses the electronic display device and deflects vertically, the electron beams impinging upon the phosphor dots or stripes in the electronic display device.

While the wobulator coils are being energized, the video image signals generated by the close-up CCD cameras 54 are analyzed and processed by the computer 20 to determine beam landing discrepancy. If desired, the video image signals generated by the wide-angle CCD cameras 58, or a selected Region of Interest thereof, can be analyzed and processed by the computer 20 to determine beam landing discrepancy.

Static Convergence

Figure 7:
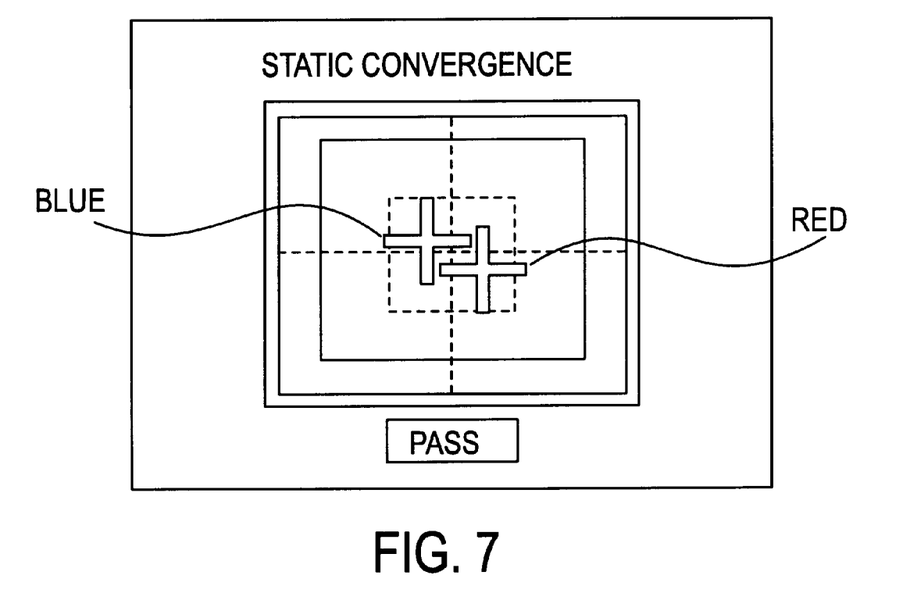

During the Static Convergence test, the computer 20 generates a graphical panel as shown in FIG. 7, for display on the operator display 24. The graphical panel reflects the result of adjustments to the magnetic correction device of the electronic display device, traditionally two pairs of yoke rings known as the four pole ring magnets and the six pole ring magnets. The operator adjusts the two pairs of yoke rings to bring the red and blue crosses as close to the center of the crosshairs as possible. During this test, the central CCD camera 54 is positioned at the center of the electronic display device and the video image signals generated by the CCD camera 54 are analyzed and processed by the computer 20. The static convergence of the electronic display device under test, as an example, is acceptable when the red and blue crosses are adjusted so that they are located within the dotted rectangle and no further than half of the width of the dotted rectangle apart.

Dynamic Convergence

Figure 8:
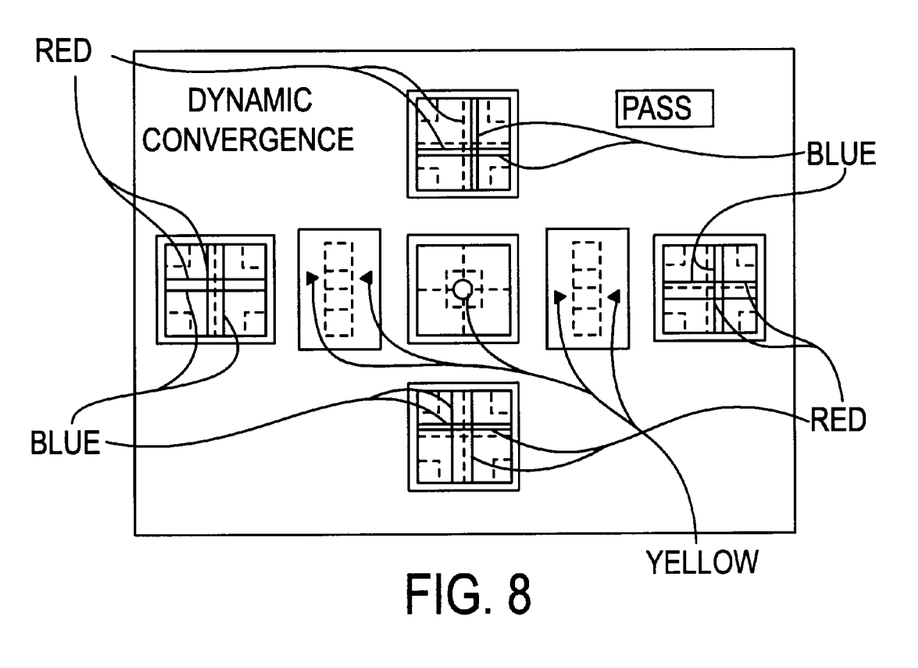

During the Dynamic Convergence test, the computer 20 generates a graphical panel as shown in FIG. 8, for display on the operator display 24. The graphical panel illustrates convergence as typically measured at four or more locations on the electronic display device. During this test, the video image signals from a number of the CCD cameras 54 are analyzed and processed by the computer 20. These four locations in the example are along the horizontal and vertical axes of the electronic display device, near to the edge of the active display area. A combined result is displayed in the center meter. If the "ball" is within the dotted rectangle, the four convergence measurements are within the specified limits. Yoke tilt is also displayed. If both Yoke tilt and measured convergence are within specified limits, a "PASS" result is obtained.

During both convergence measurements, the individual dots of color on the electronic display device cannot be analyzed by themselves for two reasons. The color dots on an electronic display device are not perfectly round but typically have very odd shapes, and due to the large cross-section of the electron beam, a group of dots are illuminated. To compensate for irregularity in beam shape, a group of dots for each color is analyzed and the relative position of the centers of their masses are calculated mathematically. By analyzing the projection, the irregular beam shapes can be compensated for to provide a more accurate measurement.

Orthogonality

Figure 9:
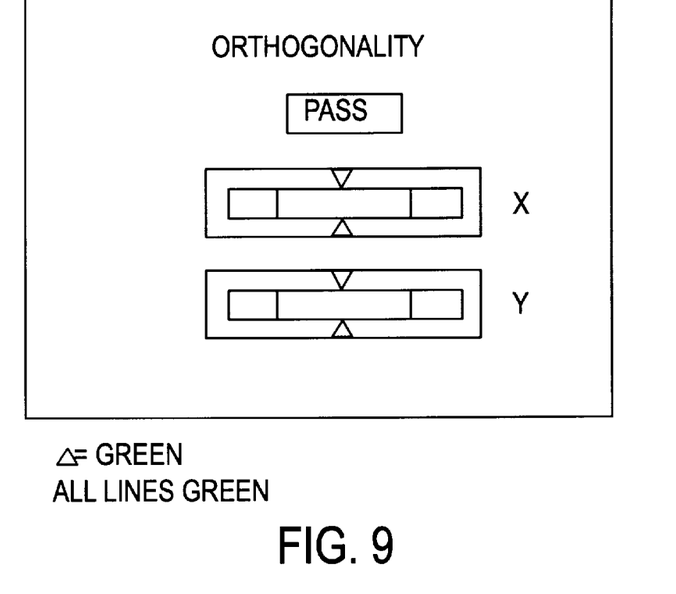

The system 10 also tests the orthogonality of the horizontal and vertical windings of the deflection yoke and displays a graphical panel on operator display 24 which includes an "X" and "Y" gauge as well as a "PASS" or "FAIL" readout, as shown in FIG. 9. The method used to determine the orthogonality of the windings is well known to those of skill in the art.

Other Geometric Features

Similar to orthogonality, a variety of other geometric tests that are well known to those of skill in the art can be performed on the electronic display device 12 by the test and alignment system 10 such as for example, pincushion and gull-wing distortion, linearity etc.

Figure 10:
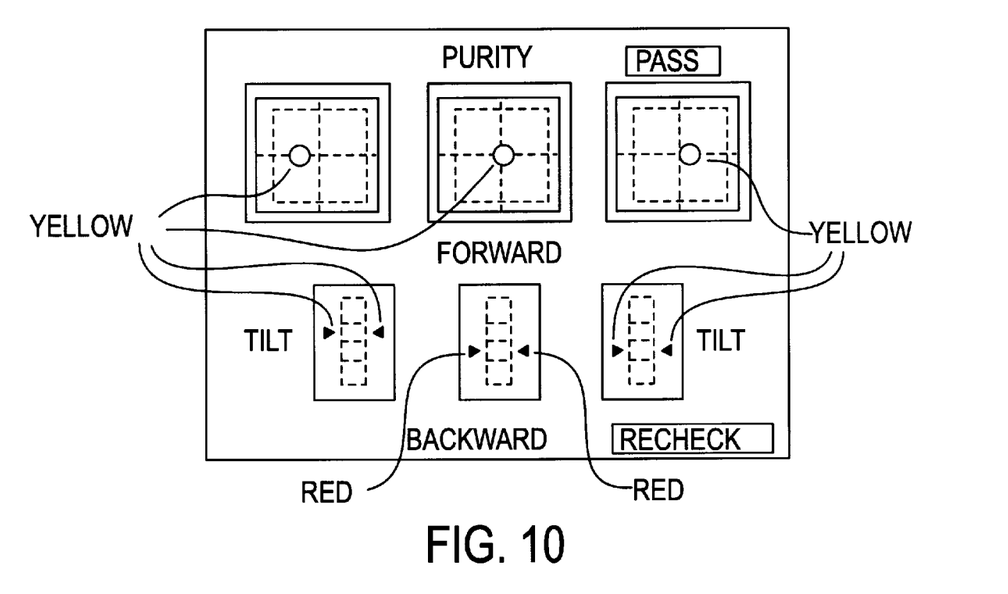

As mentioned previously, if desired, one or more of the above tests can be re-performed at any time during execution of the test and alignment routine. For example, FIG. 10 shows the graphical panel output by computer 20 for display on the operator panel 24 during re-performance of the "Color Purity/Vertical Raster Shift/Yoke Rotation" test.

As those of skill in the art will appreciate, the test and alignment system allows close-up and wide-area images of test patterns displayed on an electronic display device to be captured simultaneously permitting a series of tests to be performed on the electronic display device quickly and in real-time.

Although a preferred embodiment of the present invention has been described, those of skill in the art will appreciate that other variations and modifications may be made without departing from the scope thereof as defined by the appended claims.

We claim:

1. A test fixture for a test and alignment system for an electronic display device comprising:
   a frame;
   a plurality of close-up optical sensors mounted on said frame to sense and produce image signals corresponding to small areas of an image displayed on an electronic display device positioned adjacent said test fixture; and
   a plurality of wide-angle optical sensors mounted on said frame behind said close-up optical sensors, said wide-angle optical sensors being calibrated using a calibration grid so as to have overlapping fields of view to sense and produce image signals corresponding to substantially the entire image displayed on said electronic display device, wherein said close-up optical sensors are positioned on said frame in front of said wide-angle optical sensors so as to be outside of the fields of view of said wide-angle optical sensors, at least some of said close-up optical sensors being moveably mounted on said frame.

2. A test fixture as defined in claim 1 wherein said close-up optical sensors include a plurality of rows of optical sensors, said optical sensors being angled in a direction towards said electronic display device.

3. A test fixture as defined in claim 2 further including at least one intermediate central row of optical sensors.

4. A test fixture as defined in claim 3 wherein said central row of optical sensors includes a vertically movable central optical sensor, said central optical sensor being positioned on said frame so that the field of view thereof includes the center of said image.

5. A test fixture as defined in claim 4 wherein said central optical sensor is pivotally mounted on said frame.

6. A test fixture as defined in claim 5 wherein said central optical sensor is pivotally mounted on a cantilever.

7. A test fixture as defined in claim 2 wherein said rows of optical sensors are supported on inclined rails mounted on said frame, said rails being vertically adjustable.

8. A test fixture as defined in claim 7 wherein the optical sensors in said rows are movable laterally along said respective inclined rails.

9. A test fixture as defined in claim 8 wherein the optical sensors in said rows include drive means to move said optical sensors laterally along said rails.

10. A test fixture as defined in claim 1 further including at least one wobulator mounted on said frame for creating an alternating magnetic field to bend electron beams within said electronic display device.

11. A test fixture as defined in claim 10 wherein said at least one wobulator includes at least one pair of laterally spaced, elongate electromagnets mounted on said frame outside of the fields of view of said close-up and wide-angle optical sensors and being energizable to generate a generally uniform alternating magnetic field, said alternating magnetic field encompassing generally the entire display screen of said electronic display device.

12. A test fixture as defined in claim 11 wherein said at least one wobulator includes a pair of vertically spaced, generally horizontal electromagnets and a pair of laterally spaced, generally vertical electromagnets, said pairs of electromagnets being energizable to generate alternating magnetic fields.

13. A test and alignment system for an electronic display device comprising:
    a test pattern generator to be connected to an electronic display device for causing said electronic display device to generate images of video test patterns on said electronic display device;
    a test fixture including a frame supporting a plurality of close-up optical sensors to sense and produce image signals corresponding to small areas of images displayed on said electronic display device and a plurality of wide-angle optical sensors to sense and produce image signals corresponding to larger areas of images displayed on said electronic display device, said close-up optical sensors being positioned on said frame so as to be outside of the fields of view of said wide-angle optical sensors, at least some of said close-up optical sensors being moveable relative to said frame, said wide-angle optical sensors being calibrated using a calibration grid so as to have overlapping fields of view to sense and produce image signals corresponding to substantially the entire image displayed on said electronic display device;
    a computer controlling said test pattern generator and processing said image signals to perform a series of tests on said electronic display device; and
    a display to provide a visual indication of the results of said series of tests.

14. A test and alignment system as defined in claim 13 wherein said close-up optical sensors include a plurality of rows of optical sensors, said optical sensors being angled in a direction towards said electronic display device.

15. A test and alignment system as defined in claim 14 further including at least one intermediate central row of optical sensors.

16. A test and alignment system as defined in claim 15 wherein said central row of optical sensors includes a vertically movable central optical sensor, said central optical sensor being positioned on said frame so that the field of view thereof includes the center of said image.

17. A test and alignment system as defined in claim 16 wherein said central optical sensor is pivotally mounted on said frame.

18. A test and alignment system as defined in claim 17 wherein said central optical sensor is pivotally mounted on a cantilever.

19. A test and alignment system as defined in claim 14 wherein said rows of optical sensors are supported on inclined rails mounted on said frame, said rails being vertically adjustable.

20. A test and alignment system as defined in claim 19 wherein the optical sensors in said rows are movable laterally along said respective inclined rails.

21. A test and alignment system as defined in claim 20 wherein the optical sensors in said rows include drive means to move said optical sensors laterally along said rails.

22. A test and alignment system as defined in claim 13 further including at least one wobulator mounted on said frame for creating an alternating magnetic field to bend electron beams within said electronic display device.

23. A test and alignment system as defined in claim 22 wherein said at least one wobulator includes at least one pair of laterally spaced electromagnets mounted on said frame and being energizable to generate a generally uniform alternating magnetic field, said alternating magnetic field encompassing generally the entire display screen of said electronic display device.

24. A test and alignment system as defined in claim 23 wherein said at least one wobulator includes a pair of vertically spaced, generally horizontal electromagnets and a pair of laterally spaced, generally vertical electromagnets, said pairs of electromagnets being energizable to generate alternating magnetic fields.

25. A test fixture for a test and alignment system for an electronic display device comprising:

a frame;

at least one optical sensor mounted on said frame to sense and produce image signals corresponding to an image displayed on an electronic display device positioned adjacent said test fixture; and at least one wobulator mounted on said frame and including at least one pair of laterally spaced electromagnets, said electromagnets being energizable to generate a generally uniform alternating magnetic field generally encompassing the entire display screen of said electronic display device to bend electron beams within said electronic display device, said electromagnets being fixed to said frame outside of the field of view of said at least one optical sensor.

26. A test fixture as defined in claim 25 wherein said at least one wobulator includes a pair of vertically spaced, generally horizontal electromagnets and a pair of laterally spaced, generally vertical electromagnets, said pairs of electromagnets being energizable to generate alternating magnetic fields.

27. A test fixture as defined in claim 1 wherein at least one of said wide-angle and close-up optical sensors includes a CCD device and a fixed lens element, said CCD device being movable relative to said lens element to change the focus of said at least one optical sensor.

28. A test fixture as defined in claim 27 wherein said CCD device is mounted on a slide assembly responsive to a drive, said slide assembly being slidable along an axis parallel to an optical axis extending through said at least one optical sensor.

29. A test and alignment system as defined in claim 13 wherein at least one of said wide-angle and close-up optical sensors includes a CCD device and a fixed lens element, said CCD device being movable relative to said lens element to change the focus of said at least one optical sensor.

30. A test and alignment system as defined in claim 29 wherein said CCD device is mounted on a slide assembly responsive to a drive, said slide assembly being slidable along an axis parallel to an optical axis extending through said at least one optical sensor.

31. A test fixture for a test and alignment system for an electronic display device comprising:

a frame;

a plurality of close-up cameras mounted on said frame to sense and produce image signals corresponding to small areas of an image displayed on an electronic display device positioned adjacent said test fixture; and a plurality of wide-angle cameras mounted on said frame behind said close-up cameras and being calibrated using a calibration grid so as to have overlapping fields of view, said wide-angle cameras sensing and producing image signals corresponding to substantially the entire image displayed on said electronic display device, said close-up cameras being positioned on said frame in front of said wide-angle cameras outside of the fields of view of said wide-angle cameras.

32. A test fixture as defined in claim 31 wherein said close-up cameras are arranged in an array including a plurality of vertically spaced rows, each of said rows including a plurality of close-up cameras, said close-up cameras being angled in a direction towards said electronic display device to compensate for convexities in the shape of said electronic display device.

33. A test fixture as defined in claim 32 wherein said rows of close-up cameras are supported on inclined rails mounted on said frame, said rails being vertically adjustable.

34. A test fixture as defined in claim 33 wherein said close-up cameras are movable along said respective inclined rails.

35. A test fixture as defined in claim 31 wherein each of said wide-angle and close-up cameras includes a CCD device and a fixed lens element, said CCD device being moveable relative to said lens element to change the focus of said camera.

36. A test fixture as defined in claim 31 wherein said calibration grid includes an identifier for each of said wide-angle cameras, each identifier defining a central point for the field of view of said respective wide-angle camera.

37. A test fixture as defined in claim 36 wherein said calibration grid includes an array of apertures formed in a sheet, each said identifier being constituted by a region of said sheet devoid of apertures.

\* \* \* \* \*